US007975813B2

(12) United States Patent
Spangler et al.

(10) Patent No.: US 7,975,813 B2
(45) Date of Patent: Jul. 12, 2011

(54) ELECTROMAGNETIC SUSPENSION SYSTEM FOR A SEAT ASSEMBLY AND MACHINE USING SAME

(75) Inventors: John Spangler, Pekin, IL (US); Jonathan Chase Catton, Brimfield, IL (US); Alexander Striegel, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 840 days.

(21) Appl. No.: 11/986,942

(22) Filed: Nov. 27, 2007

(65) Prior Publication Data

US 2009/0134557 A1 May 28, 2009

(51) Int. Cl.
*F16F 15/03* (2006.01)
(52) U.S. Cl. .................. 188/267; 267/131; 248/588
(58) Field of Classification Search .................. 267/131, 267/133, 136, 140.14, 140.15; 248/421, 248/588; 188/267; 296/65.02, 65.05, 65.08, 296/65.13, 65.15; 297/339, 344.12, 344.17, 297/DIG. 10; 701/49; 310/15, 27, 12.01, 310/12.13, 12.15, 12.27, 12.29, 12.31
See application file for complete search history.

(56) References Cited

U.S. PATENT DOCUMENTS

| 4,685,731 | A | * | 8/1987 | Migut ........................... 297/339 |
| 4,870,306 | A | * | 9/1989 | Petersen ..................... 310/12.31 |
| 5,155,873 | A | * | 10/1992 | Bridges .................. 297/DIG. 10 |
| 5,735,509 | A | | 4/1998 | Gryp et al. |
| 6,193,297 | B1 | | 2/2001 | Vandermolen |
| 6,405,841 | B1 | * | 6/2002 | Zeno ............................. 188/267 |
| 6,616,117 | B2 | * | 9/2003 | Gryp et al. ..................... 248/588 |
| 7,064,461 | B2 | * | 6/2006 | Razzaghi ........................ 310/15 |
| 7,243,763 | B2 | | 7/2007 | Carlson |
| 7,341,310 | B1 | * | 3/2008 | Ross ........................ 297/344.17 |

FOREIGN PATENT DOCUMENTS

| JP | 63140141 | A | * | 6/1988 |
| JP | 09079319 | A | * | 3/1997 |
| JP | 2008196571 | A | * | 8/2008 |

OTHER PUBLICATIONS

Translation of JP 09-79319 A, Huiga et al., Mar. 1997, from JPO website.*

* cited by examiner

*Primary Examiner* — Thomas J Williams
(74) *Attorney, Agent, or Firm* — Liell & McNeil

(57) ABSTRACT

A suspension system for a seat assembly of a machine includes an upper support member and a lower support member. A pair of scissors linkages interconnect the upper and lower support members. Each of the scissors linkages includes first and second arms pivotably attached at central portions thereof. An electronic controller is in communication with a pair of electromagnetic devices positioned at first ends of the first arms. The electronic controller is configured to energize the electromagnetic devices in response to a sensor output.

17 Claims, 4 Drawing Sheets

ELECTROMAGNETIC SUSPENSION SYSTEM FOR A SEAT ASSEMBLY AND MACHINE USING SAME

TECHNICAL FIELD

The present disclosure relates generally to an electromagnetic suspension system for a seat assembly, and more particularly to incorporating electromagnetic devices into a scissors suspension system.

BACKGROUND

In many off-highway operations, a machine operator must remain seated for extended periods of time while controlling operation of the machine. Oftentimes, the machine is subject to high vibration levels that may interfere with operator control and may cause the operator to fatigue more quickly. Seats, therefore, should be designed to permit the operator to perform tasks from a comfortable position and isolate the operator, as much as possible, from these machine vibrations.

A variety of seat suspensions, including passive, semi-active, and active suspension systems, have been designed to absorb and/or dissipate the forces imparted to the seat. For example, a common scissors linkage system, incorporating an air spring for vibration absorption, is taught in U.S. Pat. No. 5,735,509. However, there is a continuing need for suspensions that are simply constructed and inexpensive, while still providing the necessary absorption of vibrations.

The present disclosure is directed to one or more of the problems set forth above.

SUMMARY OF THE DISCLOSURE

In one aspect, a suspension system for a seat assembly of a machine includes an upper support member and a lower support member. A pair of scissors linkages interconnect the upper and lower support members. Each of the scissors linkages includes first and second arms pivotably attached at central portions thereof. An electronic controller is in communication with a pair of electromagnetic devices positioned at first ends of the first arms. The electronic controller is configured to energize the electromagnetic devices in response to a sensor output.

In another aspect, a method of supporting a seat assembly of a machine includes a step of supporting the seat assembly using a pair of scissors linkages. A movement of the machine is sensed, and a pair of electromagnetic devices positioned at ends of the scissors linkages are energized in response to the machine movement.

In yet another aspect, an electromagnetic damper for a seat suspension of a machine includes a first fixed electromagnet positioned at a first end of the electromagnetic damper, and a second fixed electromagnet positioned at a second end of the electromagnetic damper. A movable electromagnet is positioned between the first and second fixed electromagnets and configured to move a movable component of the seat assembly. A first electromagnetic spacer is positioned between the first fixed electromagnet and the movable electromagnet. A second electromagnetic spacer is positioned between the second fixed electromagnet and the movable electromagnet.

DETAILED DESCRIPTION

Figure 1:
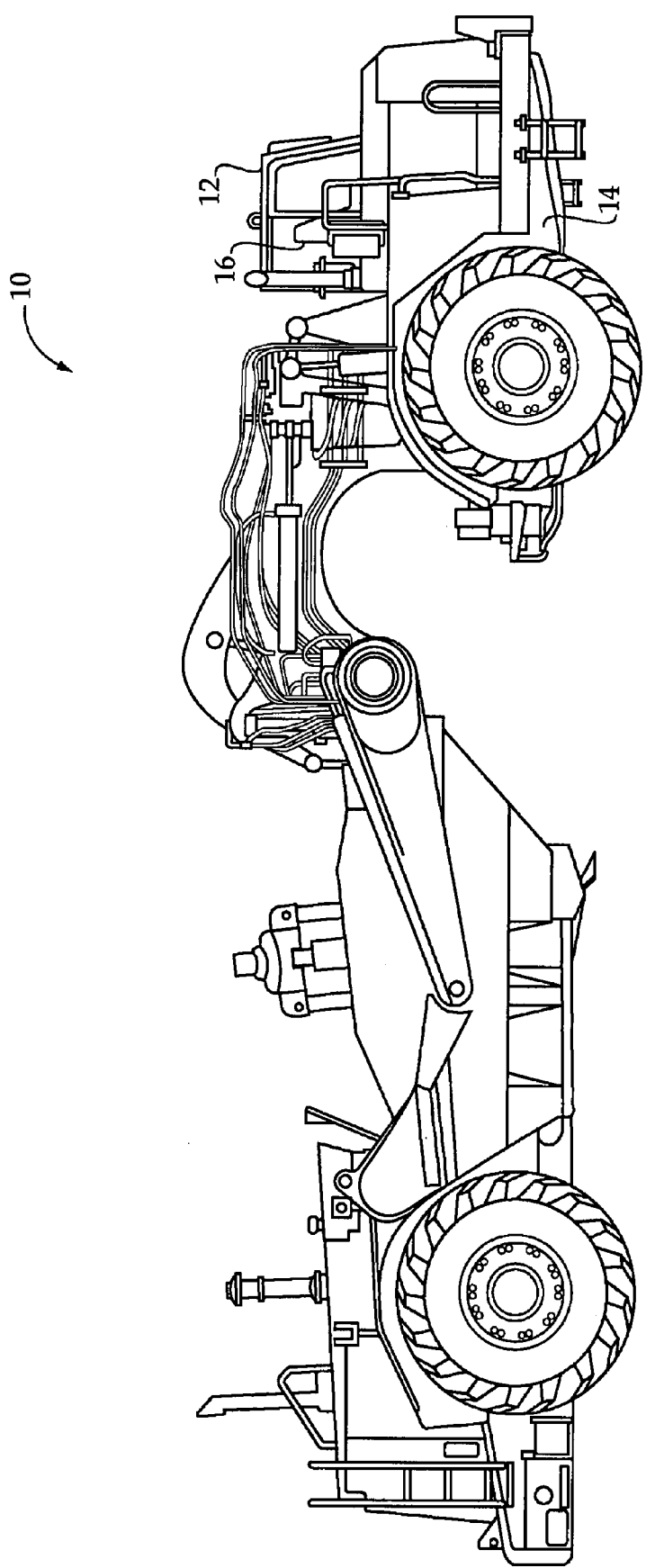
FIG. 1 is a side diagrammatic view of a machine according to the present disclosure.

An exemplary embodiment of a machine 10 is shown generally in FIG. 1. The machine 10 may be a wheel tractor scraper, as shown, or any other machine or vehicle, having an operator control station 12. Other machines may include, but are not limited to, track-type tractors, wheel loaders, articulated trucks, and other types of construction, mining, and agricultural machines. The operator control station 12 is mounted to a body 14 of the machine 10 and may include a seat assembly 16. The operator control station 12 may include various other devices, including, but not limited to, one or more machine operation controllers.

Figure 2:
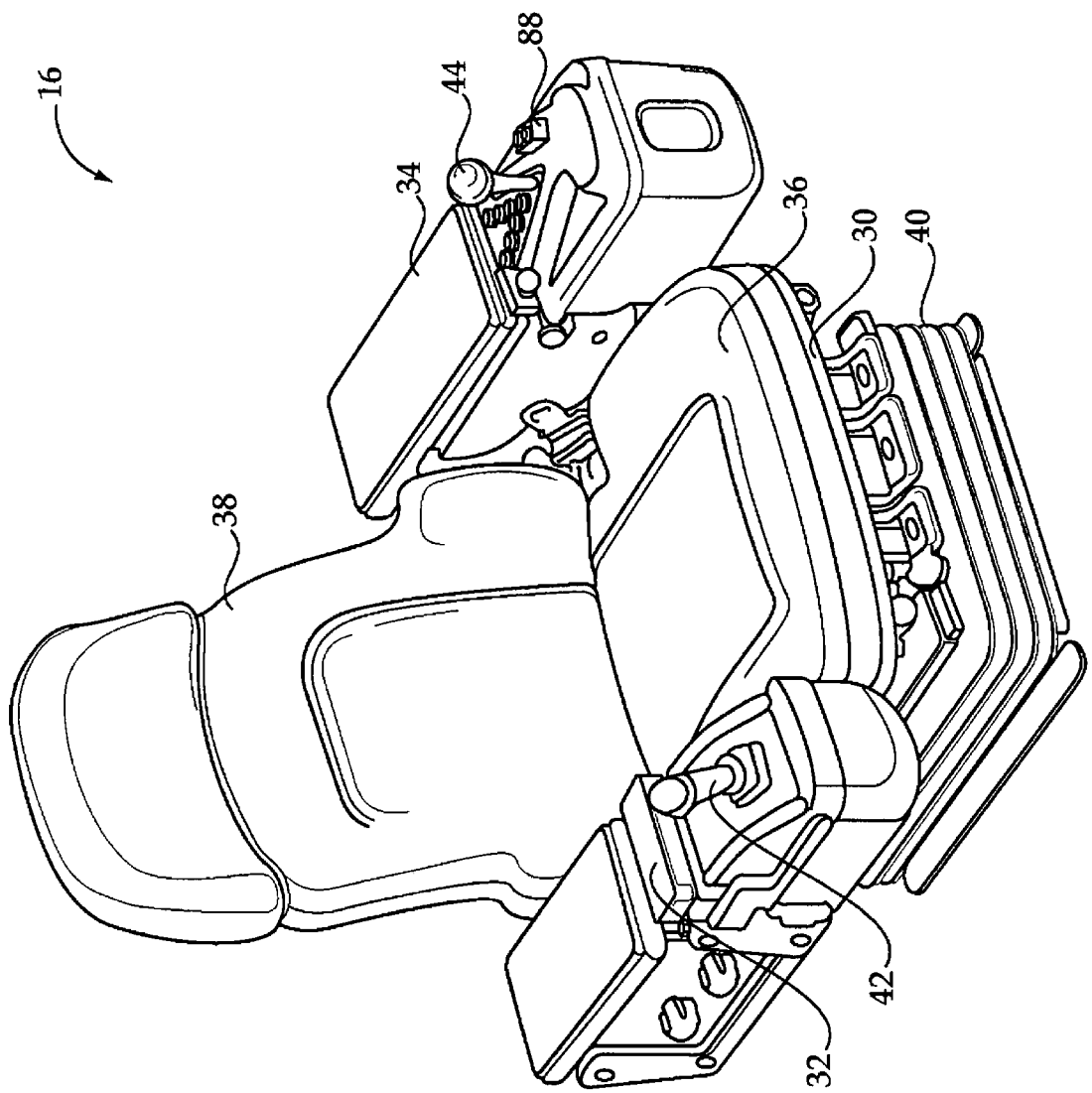
FIG. 2 is a perspective view of a seat assembly of the machine of FIG. 1.

The seat assembly 16 is shown generally in FIG. 2, and includes a seat frame 30 to which a first armrest 32, a second armrest 34, a seat 36, and a back 38 are attached. The seat frame 30 may include or may be mounted on a suspension system 40 or, more specifically, a seat suspension system for supporting the seat assembly 16 and damping vibrations or movement associated with operation of the machine 10. The seat assembly 16 may also include one or more machine operation controllers, such as controllers 42 and 44 pivotably attached to the first armrest 32 and second armrest 34, respectively. Machine operation controllers 42 and 44 may be used to control various operations of the machine 10. For example, machine operation controller 42 may include a directional controller, while machine operation controller 44 may be used to control movement of an implement of the machine 10.

Figure 3:
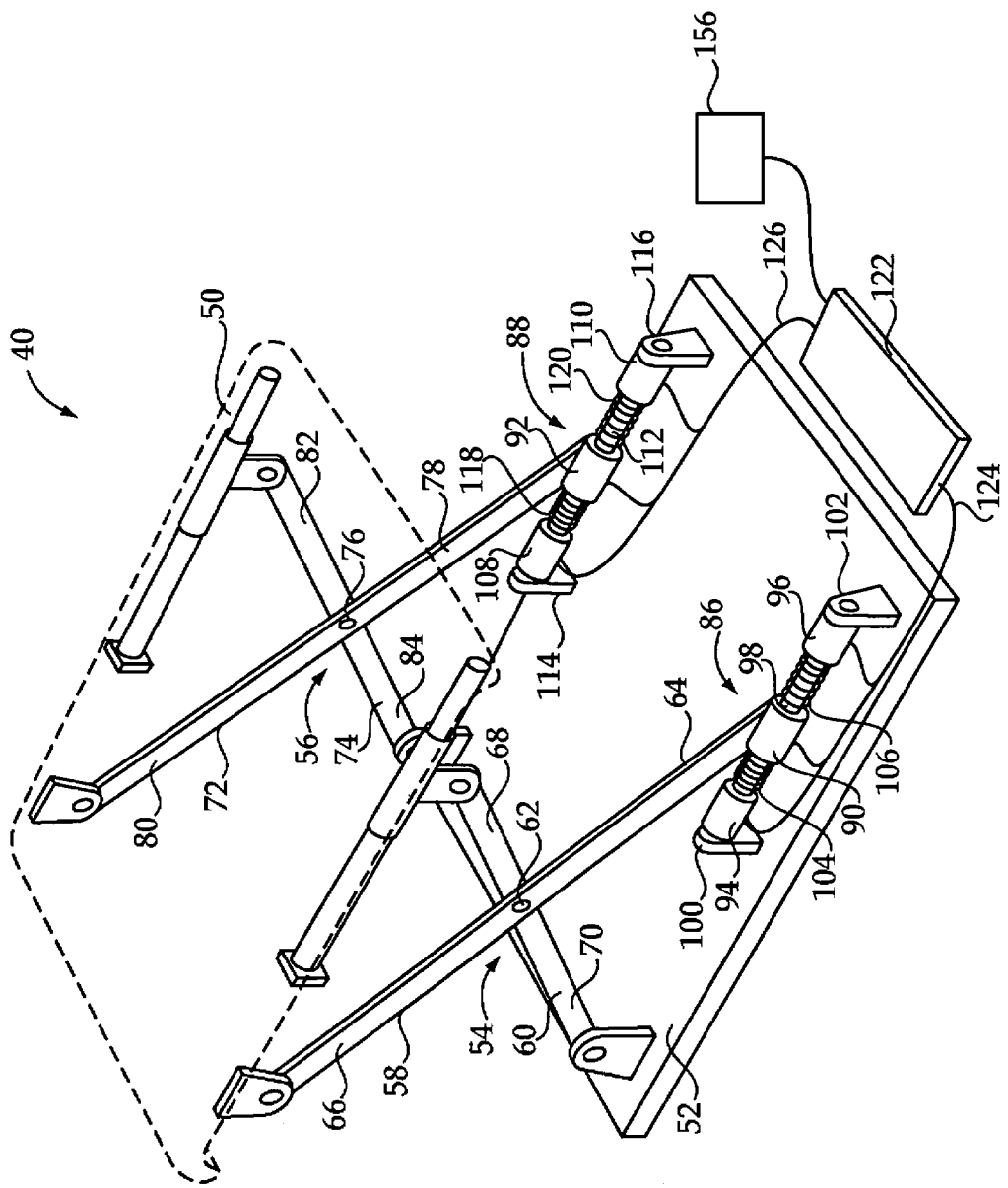
FIG. 3 is a perspective view of a suspension system of the seat assembly of FIG. 2.

Turning now to FIG. 3, the suspension system 40 is shown in greater detail. The suspension system 40 includes an upper support member 50 and a lower support member 52. Referring again to FIGS. 1 and 2, it should be appreciated that the lower support member 52 may be attached to the machine body 14 using any known attachment means, while the upper support member 50 may include the seat 36 or, alternatively, the seat frame 30 mounted thereon. Each of the upper and lower support members 50 and 52 may have a generally rectangular shaped structure. Although rectangular shaped structures are depicted for upper and lower support members 50 and 52, it should be appreciated that structures having various other shapes or cross sections may be substituted for the support members 50 and 52.

The upper and lower support members 50 and 52 are interconnected by a pair of scissors linkages 54 and 56 that may provide mechanical support for the seat assembly 16. The scissors linkages 54 and 56 may be positioned at opposite sides of the suspension system 40, as shown, and may permit vertical movement of the upper support member 50 with respect to the lower support member 52. Although both scissors linkages 54 and 56 may include similar structures, each will be discussed in turn.

Scissors linkage 54 includes a first arm 58 and a second arm 60 pivotably connected at their central portions by a pin 62. The first arm 58 includes a first end 64 that may be movably coupled with the lower support member 52, and a second end 66 that may be pivotably attached to the upper support member 50. The second arm 60 includes a first end 68 that may be movably and/or pivotably coupled with the upper support member 50, and a second end 70 that may be pivotably attached to the lower support member 52.

Similarly, scissors linkage 56 includes a first arm 72 and a second arm 74 pivotably connected at their central portions by a pin 76. The first arm 72 includes a first end 78 that may be movably coupled with the lower support member 52, and a second end 80 that may be pivotably attached to the upper support member 50. The second arm 74 includes a first end 82 that may be movably and/or pivotably coupled with the upper support member 50, and a second end 84 that may be pivotably attached to the lower support member 52. Although a specific configuration is shown, it should be appreciated that all of the first ends 64, 68, 78, and 82 may include pivotable connections, while all of the second ends 66, 70, 80, and 84 may include movable connections. Alternative connections may also be employed without deviating from the scope of the present disclosure.

A pair of electromagnetic devices 86 and 88, such as, for example, electromagnetic dampers, may be positioned at the first ends 64 and 78 of the first arms 58 and 72, and may provide movable connections between the first arms 58 and 72 and the lower support member 52. Specifically, the electromagnetic devices 86 and 88 may provide damping of movement permitted by the scissors linkages 54 and 56.

Although the electromagnetic devices 86 and 88 are shown positioned at first ends 64 and 78 of the first arms 58 and 72, it should be appreciated that the electromagnetic devices 86 and 88 may alternatively, or additionally, be positioned at the second ends 70 and 84 of the second arms 60 and 74, with minimal design modifications. Yet alternatively, the electromagnetic devices 86 and 88 may be positioned along connections between the scissors linkages 54 and 56 and the upper support member 50. However, it may be preferable to position the electromagnetic devices 86 and 88 along connections between the scissors linkages 54 and 56 and the lower support member 52.

Each of the electromagnetic devices 86 and 88 may be positioned parallel, or substantially parallel, to the lower support member 52, and may include movable magnets 90 and 92. The movable magnets 90 and 92 may include permanent magnets or electromagnets, and may be fixedly attached to, and movable with, the first ends 64 and 78 of the first arms 58 and 72. Turning specifically to electromagnetic device 86, movable magnet 90 may include an electromagnet that is fixedly attached to, or integral with, the first end 64 of the first arm 58. The movable magnet 90 may be movable along a guide rod 98, or other similar device, between two fixed electromagnets 94 and 96. The fixed electromagnets 94 and 96 may be also be positioned along the guide rod 98 at ends thereof, such as, for example, adjacent end plates 100 and 102. Springs 104 and 106 may be provided along the guide rod 98 between each of the fixed electromagnets 94 and 96 and the movable magnet 90, and may be configured to provide a predetermined spring force.

Electromagnetic device 88 may be similar to electromagnetic device 86 in both design and function. Specifically, the movable magnet 92 may include an electromagnet, and may be positioned between fixed electromagnets 108 and 110. The movable magnet 92 and the fixed electromagnets 108 and 110 may all be positioned along a guide rod 112 that extends between or through end plates 114 and 116. Springs 118 and 120, each providing a predetermined spring force, may also be positioned along the guide rod 112, between each of the fixed electromagnets 108 and 110 and the movable magnet 92.

An electronic controller 122 may communicate with each of the electromagnetic devices 86 and 88 via one or more electrical lines, such as electrical lines 124 and 126. The electronic controller 122 may be of standard design and includes a processor, such as, for example, a central processing unit (CPU), a memory, and an input/output circuit that facilitates communication internal and external to the electronic controller 122. The processor controls operation of the electronic controller 122 by executing operating instructions, such as, for example, computer readable program code stored in memory, wherein operations may be initiated internally or externally to the electronic controller 122. A control scheme may be utilized that monitors outputs of systems or devices, such as, for example, sensors, actuators, or control units, via the input/output circuit to control inputs to various other systems or devices. Specifically, for example, the electronic controller 122 may monitor motion sensing devices, such as, for example, one or more accelerometers, and energize the electromagnetic devices 86 and 88 in response to the motion.

The memory may comprise temporary storage areas, such as, for example, cache, virtual memory, or random access memory (RAM), or permanent storage areas, such as, for example, read-only memory (ROM), removable drives, network/internet storage, hard drives, flash memory, memory sticks, or any other known volatile or non-volatile data storage devices located internally or externally to the electronic controller 122. One skilled in the art will appreciate that any computer-based system or device utilizing similar components for controlling the electromagnetic devices 86 and 88 is suitable for use with the present disclosure.

According to one embodiment, the electronic controller 122 may be configured to energize the electromagnetic devices 86 and 88 in response to an expansion or contraction of the scissors linkages 54 and 56. This expansion or contraction may be responsive to a movement of the machine 10 and, therefore, may be anticipated by sensing the machine movement by monitoring one or more accelerometers, or other similar devices. The electronic controller 122 may include a control scheme for energizing the electromagnetic devices 86 and 88, in response to the sensor output, to compensate for the movement. More specifically, the electronic controller 122 may energize one or both of the fixed electromagnets 94 and 96 to attract or repel the movable magnet 90, thereby moving the first arm 58 of scissors linkage 54 in a desired direction. Simultaneously, the electronic controller 122 may energize one or both of the fixed electromagnets 108 and 110 to similarly attract or repel the movable magnet 92 and the first arm 74 of scissors linkage 56. Movable magnets 90 and 92 may also be appropriately energized to increase the strength of the magnetic force. However, it should be appreciated that permanent magnets are also contemplated for movable magnets 90 and 92. It should also be appreciated that the electronic controller 122 may also be configured to change a current strength and/or polarity of any of the movable magnets 90 and 92 and fixed electromagnets 94, 96, 108, and 110, as necessary, to counteract and/or provide damping of the movement of the scissors linkages 54 and 56.

Figure 4:
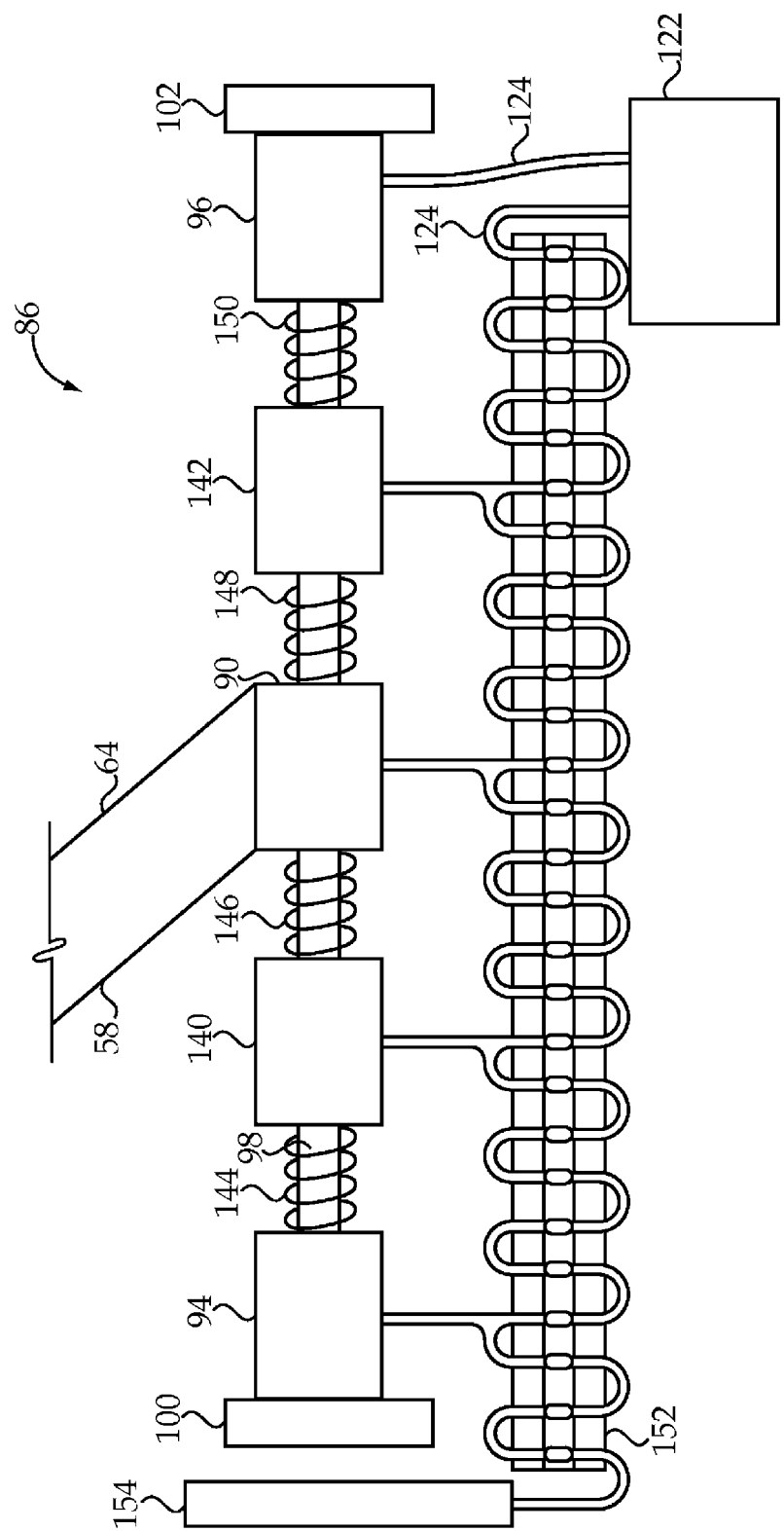
FIG. 4 is a side diagrammatic view of an alternative embodiment of an electromagnetic device for use with the suspension system of FIG. 3.

Turning now to FIG. 4, an alternative embodiment of an electromagnetic device, such as, for example, electromagnetic device 86, is shown. The electromagnetic device 86 of FIG. 4 may also include a first electromagnetic spacer 140 positioned between the first fixed electromagnet 94 and movable magnet 90, and a second electromagnetic spacer 142 positioned between movable magnet 90 and the second fixed electromagnet 96. Both of the electromagnetic spacers 140 and 142 may be movable along the guide rod 98, similar to movable magnet 90.

A first spring 144 may be positioned between the first fixed electromagnet 94 and the first electromagnetic spacer 140, and a second spring 146 may be positioned between the first electromagnetic spacer 140 and the movable magnet 90. Similarly, a third spring 148 may be positioned between the movable magnet 90 and the second electromagnetic spacer 142, and a fourth spring 150 may be positioned between the second electromagnetic spacer 142 and the second fixed electromagnet 96. All of the springs 144, 146, 148, and 150 may be provided with sufficient preload to maintain the electromagnetic spacers 140 and 142, and movable magnet 90 at desired initial positions. It should be appreciated that, since the movable magnet 90 is attached to the scissors linkage 54, the springs 144, 146, 148, and 150 may maintain the scissors linkage 54 and, indirectly, the upper support member 50 at a desired initial position.

The electronic controller 122 may also communicate with the electromagnetic spacers 140 and 142 via electrical line 124, and may also be configured to energize the electromagnetic spacers 140 and 142 in response to a movement of the machine 10. Although only two electromagnetic spacers 140 and 142 are shown, it should be appreciated that additional movable electromagnets may be provided along the guide rod 98. The number of movable electromagnets may be increased or decreased to provide the desired magnetic field intensity across the length of the guide rod 98.

A guide rail 152 may also be provided for carrying an electrical line, such as electrical line 124. Since, electrical line 124 may connect the electronic controller 122 with one or more of the movable magnet 90, fixed electromagnets 94 and 96, and electromagnetic spacers 140 and 142, it may be desirable to allow the electrical line 124 to move along the guide rail 152 in an accordion-like manner. The guide rail 152 may be positioned adjacent the guide rod 98 and may have a length corresponding to a length of the guide rod 98. A cooling device 154 may also be provided, in communication with the electronic controller 122, for directing air over at least one of the movable magnet 90, fixed electromagnets 94 and 96, and electromagnetic spacers 140 and 142. Alternatively, cooled air from an HVAC system of the machine 10 could be directed over the electromagnetic device 86. Yet alternatively, a thermoelectric generator may be positioned to pass a cool air current over the electromagnetic device 86.

It should be appreciated that electromagnetic device 88 may be similar to electromagnetic device 86 in both design and function and, therefore, may include all of the additional components shown in the embodiment of FIG. 4. It should also be appreciated that the suspension system 40 may be used with additional suspension, damping, and height adjustment devices, as are well known in the art.

INDUSTRIAL APPLICABILITY

Referring to FIGS. 1-4, an exemplary embodiment of a machine 10 may include a wheel tractor scraper, as shown, or any other machine or vehicle, having an operator control station 12. The operator control station 12 is mounted to a body 14 of the machine 10 and may include a seat assembly 16. The operator control station 12 may include various other devices, including, but not limited to, one or more machine operation controllers. For example, machine operation controller 42 may include a directional controller, while machine operation controller 44 may be used to control movement of an implement of the machine 10.

An operator of the machine 10 may have to remain seated, and typically coupled to the seat assembly 16 via a seatbelt, for extended periods of time while controlling operation of the machine 10. The seat assembly 16, therefore, should be designed to permit the operator to perform tasks from a comfortable position and isolate the operator, as much as possible, from vibrations of the machine 10. This is of particular importance for machines subject to high vibration levels. Wheel tractor scrapers, for example, often perform initial clearing and excavation and, therefore, operate over very rough terrain. These increased vibrations may interfere with operator control and may cause the operator to fatigue more quickly, and may disrupt machine operation.

During a typical operation, an operator may sit in the seat assembly 16 and adjust the height of the seat assembly 16 using a height adjustment feature. The height adjustment feature may be incorporated with, or separate from, the electromagnetic devices 86 and 88. For example, one or more of the electromagnets of the electromagnetic devices 86 and 88 may be continuously energized to maintain the scissors linkages 54 and 56 at desired positions and, therefore, the seat assembly 16 at a desired height. Alternatively, one or more well known air springs may be used for height adjustment and/or shock absorption. Once at a desired height, the operator may actuate a machine operation controller, such as a directional controller 42, to move the machine 10 in a desired direction. As the machine 10 moves, it may encounter a rut that causes the machine 10 to drop.

The suspension system 40 vertically isolates the seat assembly 16 and, therefore, the operator from this movement using the scissors linkages 54 and 56. Specifically, the scissors linkages 54 and 56 may contract and allow vertical movement of the upper support member 50 with respect to the lower support member 52. Electromagnetic devices 86 and 88 may be provided for actively damping the vibration of the upper support member 50 in response to the vertical movement permitted by the scissors linkages 54 and 56. Specifically, the electronic controller 122 may sense the machine movement via a motion sensing device 156, such as an accelerometer, and energize the electromagnetic devices 86 and 88 to provide active damping of the movement of the scissors linkages 54 and 56 in response to the sensor output. It should be appreciated that the motion sensing device 156, and any additional sensors, may be positioned at any desired position of the machine 10 and/or seat assembly 16.

For example, according to the embodiment of FIG. 3, fixed electromagnet 94 may be energized to repel the movable magnet 90. Alternatively, or additionally, fixed electromagnet 96 may be energized to attract the movable magnet 90. Movable magnet 90 may also be energized to increase the magnetic force repelling or attracting movable magnet 90. Simultaneously, one or more of fixed electromagnets 108 and 110 and movable magnet 92 of electromagnetic device 88 may be energized to similarly move the movable magnet 92 along the guide rod 112. Additional movable electromagnets, such as electromagnetic spacers 140 and 142 shown in FIG. 4, may be provided to increase magnetic field intensity along the guide rods 98 and 112.

As the machine 10 passes out of the rut and moves upward, the scissors linkages 54 and 56 may expand, again isolating the seat assembly 16 and operator from this vertical movement. Electromagnetic devices 86 and 88 again provide damping of the vibration of the upper support member 50 in response to the movement permitted by the scissors linkages 54 and 56. For example, fixed electromagnet 94 may be energized to attract the movable magnet 90. Alternatively, or additionally, fixed electromagnet 96 may be energized to repel the movable magnet 90. Movable magnet 90 may also be energized to increase the magnetic force repelling or attracting movable magnet 90. Simultaneously, one or more of fixed electromagnets 108 and 110 and movable magnet 92 of electromagnetic device 88 may be energized to similarly move the movable magnet 92 along the guide rod 112.

The machine 10 then returns to an initialized position in which the springs, such as springs 104, 106, 118, and 120, of the electromagnetic devices 86 and 88 bias the upper support member 50 of the seat assembly a predetermined distance from the lower support member 52. It should be appreciated that additional features and enhancements, such as, for example, the guide rail 152 and cooling device 154, may also be incorporated into the suspension system 40. It should also be appreciated that the electronic controller 122 may be attached to either of the upper and lower support members 50 and 52 so that the suspension system 40 and/or seat assembly 16 may easily be provided as a retrofit to current machines.

The suspension system 40 of the present disclosure provides a relatively simple means for providing vibration isolation and damping that is not subject to some of the failures of a typical scissors type suspension. Specifically, scissors suspensions include several pivot joints that may be subject to wear and fatigue, often resulting in a loosening of the mechanism. The current suspension system 40 incorporates the use of electromagnetic devices 86 and 88 to provide active damping with less physical contact between parts. Therefore, the current suspension system 40 is capable of providing a more reliable and durable suspension system for a seat assembly of a machine.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A suspension system for a seat assembly of a machine, comprising:
    an upper support member;
    a lower support member;
    a pair of scissors linkages interconnecting the upper and lower support members, wherein each of the scissors linkages includes a first arm and a second arm pivotably attached at central portions thereof;
    a pair of electromagnetic devices positioned at first ends of the first arms, wherein each of the electromagnetic devices includes a movable magnet and first and second stationary magnets positioned along a guide rod, wherein the movable magnet is movable along the guide rod between the first and second stationary magnets, wherein each electromagnetic devices further includes a first spring positioned between the first stationary magnet and the movable magnet and a second spring positioned between the second stationary magnet and the movable magnet and;
    an electronic controller in communication with the electromagnetic devices, wherein the electronic controller is configured to energize the electromagnetic devices in response to a sensor output.

2. The suspension system of claim 1, wherein the electromagnetic devices are positioned parallel to the lower support member.

3. The suspension system of claim 1, wherein the movable magnet of each of the electromagnetic devices is a movable permanent magnet attached to one of the first ends, and the first and second stationary magnet of each of the electromagnetic devices are first and second fixed electromagnets.

4. The suspension system of claim 1, wherein the movable magnet of each of the electromagnetic devices is a movable electromagnet attached to one of the first ends, and the first and second stationary magnet of each of the electromagnetic devices are first and second fixed electromagnets.

5. The suspension system of claim 4, further including first electromagnetic spacers positioned between the first fixed electromagnets and the movable electromagnets, and second electromagnetic spacers positioned between the second fixed electromagnets and the movable electromagnets.

6. The suspension system of claim 5, wherein the first springs of the electromagnetic devices are positioned between the first fixed electromagnets and the first electromagnetic spacers, and the second springs of the electromagnetic devices are positioned between the first electromagnetic spacers and the movable electromagnets, wherein the electromagnetic devices further include third springs positioned between the movable electromagnets and the second electromagnetic spacers, and fourth springs positioned between the second electromagnetic spacers and the second fixed electromagnets.

7. The suspension system of claim 6, wherein the electronic controller is further configured to energize at least one of the fixed electromagnets, movable electromagnets, and electromagnetic spacers.

8. The suspension system of claim 7, further including a cooling device for directing air over at least one of the fixed electromagnets, movable electromagnets, and electromagnetic spacers.

9. The suspension system of claim 7, further including a guide rail for carrying an electrical line, wherein the electrical line is connected to the electronic controller and at least one of the fixed electromagnets, movable electromagnets, and electromagnetic spacers.

10. A method of supporting a seat assembly of a machine, comprising:
    supporting the seat assembly using a pair of scissors linkages;
    sensing a movement of the machine; and
    energizing a pair of electromagnetic devices positioned at ends of the scissors linkages in response to the machine movement, wherein the energizing step includes moving a movable magnet along a guide rod between first and second fixed magnets positioned along the guide rod;
    wherein the supporting step includes biasing an upper support member away from a lower support member using first springs positioned between the first fixed magnets and the movable magnets, and second springs positioned between the second fixed magnets and the movable magnets.

11. The method of claim 10, wherein the energizing step includes contracting or expanding the scissors linkages, at least in part, by energizing at least one of first and second fixed electromagnets positioned at ends of the electromagnetic devices and movable electromagnets positioned between the first and second fixed electromagnets.

12. The method of claim 11, wherein the energizing step further includes at least one of attracting or repelling the movable electromagnets, wherein the movable electromagnets are attached to ends of the scissors linkages.

13. The method of claim 12, wherein the energizing step further includes at least one of attracting or repelling first and second electromagnetic spacers, wherein the first electromagnetic spacers are positioned between the first fixed electromagnets and the movable electromagnets, and the second electromagnetic spacers are positioned between the movable electromagnets and the second fixed electromagnets.

14. The method of claim 13, wherein the energizing step further includes changing a current strength provided to at least one of the fixed electromagnets, movable electromagnets, and electromagnetic spacers.

15. The method of claim 13, wherein the energizing step further includes changing a polarity of at least one of the fixed electromagnets, movable electromagnets, and electromagnetic spacers.

16. An electromagnetic damper for a seat suspension of a machine, comprising:
- a first fixed electromagnet positioned along a guide rod at a first end of the electromagnetic damper;
- a second fixed electromagnet positioned along the guide rod at a second end of the electromagnetic damper;
- a movable electromagnet movable along the guide rod between the first and second fixed electromagnets and configured to move a movable component of the seat assembly;
- a first electromagnetic spacer movable along the guide rod between the first fixed electromagnet and the movable electromagnet; and
- a second electromagnetic spacer movable along the guide rod between the second fixed electromagnet and the movable electromagnet.

17. The electromagnetic damper of claim 16, further including an electronic controller for energizing at least one of the fixed electromagnets, movable electromagnets, and electromagnetic spacers in response to a movement of the machine.

* * * * *